(12) United States Patent
Tran-Thi et al.

(10) Patent No.: US 11,904,268 B2
(45) Date of Patent: Feb. 20, 2024

(54) PREPARATION OF NEW ALDEHYDE AND/OR KETONE TRAPS AND FILTERS

(71) Applicants: COMMISSARIAT A L'ENERGIE ATOMIQUE ET AUX ENERGIES ALTERNATIVES, Paris (FR); CENTRE NATIONAL DE LA RECHERCHE SCIENTIFIQUE—CNRS—, Paris (FR)

(72) Inventors: Thu-Hoa Tran-Thi, Montrouge (FR); Ana Borta, Palaiseau (FR); Mickael Gineys, Crolles (FR); Marie-Pierre Som, Crolles (FR); Frédéric Hammel, Crolles (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE—CNRS—, Paris (FR)

( * ) Notice: Subject to any disclaimer, the term of this patent is extended or adjusted under 35 U.S.C. 154(b) by 0 days.

(21) Appl. No.: 18/067,120

(22) Filed: Dec. 16, 2022

(65) Prior Publication Data

US 2023/0121377 A1 Apr. 20, 2023

Related U.S. Application Data

(62) Division of application No. 16/634,633, filed as application No. PCT/FR2018/051951 on Jul. 27, 2018, now Pat. No. 11,571,650.

(30) Foreign Application Priority Data

Jul. 28, 2017 (FR) ..................................... 17 57251

(51) Int. Cl.
*B01D 53/02* (2006.01)
*B01J 20/20* (2006.01)
(Continued)

(52) U.S. Cl.
CPC .............. *B01D 53/02* (2013.01); *B01J 20/20* (2013.01); *B01D 2253/106* (2013.01);
(Continued)

(58) Field of Classification Search
CPC .............. B01D 53/02; B01D 2253/106; B01D 2253/306; B01D 2253/308;
(Continued)

(56) References Cited

U.S. PATENT DOCUMENTS 8,053,479 B2 * 11/2011 Masuda ............... C09K 3/1463
516/86
2017/0036187 A1 * 2/2017 Sugiura ..................... A61L 9/01

FOREIGN PATENT DOCUMENTS

JP 2008178788 A * 8/2008 .............. B01J 20/22
JP 2008178788 A 8/2008
(Continued)

OTHER PUBLICATIONS

JP2008178788A_English (Year: 2008).*
(Continued)

*Primary Examiner* — Youngsul Jeong
(74) *Attorney, Agent, or Firm* — Maier & Maier, PLLC (57) ABSTRACT

A method for preparing a nanoporous silica sol-gel matrix containing at least one amine reactant selected from hydroxylamine, methylhydroxylamine, tertbutylhydroxylamine, methoxyamine, tetraethylenepentamine, dicarboxylic acid dihydrazides, particularly adipic acid dihydrazide, and the salts thereof, said method including the following steps: a) synthesising a gel from tetramethoxysilane or from a mixture of tetramethoxysilane and another organosilicon pre-
(Continued)

cursor selected from among phenyltrimethoxysilane, phenyltriethoxysilane, a fluoroalkyltrimethoxysilane, a fluoroalkyltriethoxysilane, a chloroalkylmethoxysilane, a chloroalkylethoxysilane, an alkyltrimethoxysilane, an alkyltriethoxysilane, an aminopropyltriethoxysilane and the mixtures thereof, the synthesis being performed in an aqueous medium at a temperature ranging from 10 to 70° C. in the presence of at least one amine reactant selected from among hydroxylamine, methylhydroxylamine, tertbutylhydroxylamine, methoxyamine, dicarboxylic acid dihydrazides, particularly adipic acid dihydrazide, and the salts thereof; b) drying the gel obtained during step a) so as to obtain a sol-gel matrix containing at least one amine reactant.

11 Claims, 1 Drawing Sheet (51) Int. Cl.
*B01J 20/10* (2006.01)
*B01J 20/22* (2006.01)
*B01J 20/28* (2006.01)

(52) U.S. Cl.
CPC .. *B01D 2253/306* (2013.01); *B01D 2253/308* (2013.01); *B01D 2258/06* (2013.01); *B01J 20/103* (2013.01); *B01J 20/22* (2013.01); *B01J 20/28057* (2013.01)

(58) Field of Classification Search
CPC ..... B01D 2258/06; B01J 20/20; B01J 20/103; B01J 20/22; B01J 20/28057
See application file for complete search history.

(56) References Cited

FOREIGN PATENT DOCUMENTS

| WO | 2007031657 A2 | 3/2007 | |
|---|---|---|---|
| WO | 2016046498 A1 | 3/2016 | |
| WO | WO-2016046498 A1 * | 3/2016 | ......... B01D 46/0008 |

OTHER PUBLICATIONS

WO-2016046498-A1_English (Year: 2016).*
International Search Report dated Jul. 12, 2018 in corresponding International application No. PCT/FR2018/051951; 7 pages.
Suslick et al., "A Simple and Highly Sensitive Colorimetric Detection Method for Gaseous Formaldehyde" J. Am. Chem. Soc. 2010. 132, Published on Web Mar. 10, 2010, 4046-4047, 2 pgs.
Denda et al., "Thin films exhibiting multicolor changes induced by formaldehyde-responsive release of anionic dyes", Talanta 144(2015); Available online: Jun. 20, 2015, 816-822, 7 pgs.

* cited by examiner

PREPARATION OF NEW ALDEHYDE AND/OR KETONE TRAPS AND FILTERS

CROSS-REFERENCE TO RELATED APPLICATIONS

This application is a Division of U.S. patent application Ser. No. 16/634,633, filed Jan. 28, 2020, which is a National Stage of International Application No. PCT/FR2018/051951, filed on Jul. 27, 2018, which claims priority to France Patent Application No. 17 57251, filed on Jul. 28, 2017, the disclosures of each of which are incorporated herein by reference for all purposes as if fully set forth herein.

FIELD

The disclosure relates to a process for preparing a new nanoporous silicate sol-gel matrix comprising at least one amino reagent, to the matrix itself, and to use thereof as aldehyde and ketone filters.

BACKGROUND

The majority of the adsorbent materials used for trapping carbonyl compounds such as aldehydes and ketones are porous materials which are impregnated with reagents capable of reacting with the aldehydes or carbonyl compounds, to produce products of varying stability which often-times are not colored.

This is the case for the Radiello® cartridges of silica impregnated with 2,4-dinitrophenylhydrazine, which are widely used globally for the trapping of carbonyl compounds. The products formed by the reaction between the hydrazine and the aldehydes and ketones are hydrazone derivatives which absorb in the UV and are therefore not colored. On the same principle, Dräger (Lubeck, Germany) offers reactive tubes filled either with glass fibers or with silica gels which are impregnated with hydrazine derivatives, permitting the trapping of aldehydes. The resulting hydrazone derivatives are not colored. It should also be noted that both the Radiello® cartridges and the Dräger® tubes are used solely for measuring aldehyde and ketone levels and not as specific filters. The hydrazones formed are eluted and then separated by liquid chromatography, and measured optically. Both the Radiello® cartridges and the Dräger® tubes involve impregnation of the adsorbent material with reagents.

Nanoporous filters for the trapping of aldehydes, doped with an enaminone, preferably Fluoral-P, have been described in international patent application WO 2007/031657 A2. Filters of these kinds are sold by Ethera company under the name Puretech® as selective filters for the trapping of aldehydes, with a gradual change in coloration from pale yellow to deep yellow, to orange and brown at saturation. This filter, however, traps only aldehydes; Fluoral-P reacts only with aldehydes and undergoes coloration only with formaldehyde, with which it forms a cyclic compound which absorbs in the visible with a maximum centered around 410 nm. Accordingly, if the filter is used for trapping aldehydes other than formaldehyde, the coloration will not be developed upon saturation of the filter.

There are numerous amino reagents known for reaction with carbonyl compounds such as aldehydes and ketones: for example, ammonia, primary amines, hydroxylamine, hydrazine, phenylhydrazine, semicarbazide and hydrazide. These reactions are all catalyzed in acidic medium and the pH of the reaction medium plays an important role in the stability of the products formed. Moreover, these amino compounds, when used in the commercialized processes, produce no coloration.

In order to produce a coloration, it is therefore necessary to add a dye to the amino reagents. In a first case described in the literature, Denda et al. (Thin films exhibiting multicolor changes induced by formaldehyde-responsive release of anionic dyes; Talanta 144(2015); 816-822) used protonated primary and secondary amines in a polyacrylamide film in the presence of various anionic dyes. These dyes with the cationic amines form electrostatic complexes which are stable to a greater or lesser extent. Accordingly, when the film is immersed into a solution containing formaldehyde, the reaction of the amines with the formaldehyde will release the dye, which is released in the solution, which undergoes coloration.

In a second case described in the literature, Suslick et al. (A Simple and Highly Sensitive Colorimetric Detection Method for Gaseous Formaldehyde; J. Am. Chem. Soc. 2010. 132, 4046-4047) report another process, in which the amino reagent is mixed with a pH-sensitive dye in a polyvinylidene difluoride membrane. The change in pH on reaction of the amine with the formaldehyde gives rise to coloration of the dye, which is of appropriately selected pKa.

In the two cases cited, the materials are based on low-porosity polymer and the sensors are in the form of thin films, in order to promote the diffusion of the formaldehyde, which is the smallest of the aldehydes. A process of this kind cannot be envisaged for the trapping of larger carbonyl compounds, and especially for making filters for depollution—the film is quickly saturated and must therefore be renewed often.

Lastly, the filters of the prior art do not always take account of the need for irreversible trapping and/or for preventing pollutant releases when the trapping reaction is reversible or when the filter reaches saturation.

SUMMARY

The aim of the present invention is therefore to provide new materials which allow effective trapping of aldehydes and ketones present in the ambient air and avoidance of their release into the environment.silicate The inventors to their merit have discovered, very unexpectedly and after extensive research, that it was possible to achieve this aim with filters based on a nanoporous silicate sol-gel matrix whose pores contain high concentrations of derivatives of hydroxylamine chloride, methylhydroxylamine hydrochloride, tert-butylhydroxylamine hydrochloride, methoxyamine hydrochloride. Under these conditions, indeed, these compounds form colored reaction products with the aldehydes and the ketones in acidic medium, the coloration appearing only when the matrix is saturated with these pollutants. For example, a green coloration is obtained at saturation when the pollutant is formaldehyde or acetone, and a reddish-brown coloration with benzaldehyde. Accordingly, the filters of the invention can easily be changed before any possible release of the trapped pollutant or pollutants.

A sol gel matrix is a material obtained by a sol-gel process which involves using precursors in the form of metal alkoxides of formula $M(OR)_x R'_{n-x}$, where M is a metal, especially silicon, R is an alkyl group and R' is a group which carries one or more functional groups, with n=4 and x varying between 2 and 4. Where M is Si, the alkoxy groups (OR) are hydrolyzed in the present of water to form silanol groups (Si—OH). These latter groups condense to form siloxane bonds (Si—O—Si—). Small particles are formed, with a size generally of less than 1 μm, and undergo aggregation to form masses which remain in suspension without precipitating, so forming a sol. The increases in the masses and their condensation increases the viscosity of the medium, which undergoes gelling. Drying of the gel produces a porous solid material, with the expulsion of the solvent from the polymeric network formed (syneresis). The sol-gel matrices obtained from metal alkoxides of formula $M(OR)R'_{n-x}$ where M is Si are called silicate sol-gel matrices in the present application.

A nanoporous matrix is a porous matrix in which the size of the pores is less than 100 nm.

In a first subject, therefore, the invention relates to a process for preparing a nanoporous silicate sol-gel matrix comprising at least one amino reagent selected from hydroxylamine, methylhydroxylamine, tert-butylhydroxylamine, methoxyamine, tetraethylenepentamine and dicarboxylic acid dihydrazides, especially adipic acid dihydrazide, and salts thereof, said process comprising the following steps:

a) synthesizing a gel from tetramethoxysilane or a mixture of tetramethoxysilane and another organosilicon precursor, selected from phenyltrimethoxysilane, phenyltriethoxysilane, a chloroalkylmethoxysilane, a chloroalkylethoxysilane, an alkyltrimethoxysilane, an alkyltriethoxysilane, an aminopropyltriethoxysilane and mixtures thereof, the synthesis being carried out in an aqueous medium at a temperature of from 10 to 70° C. in the presence of at least one amino reagent selected from hydroxylamine, methylhydroxylamine, tert-butylhydroxylamine, methoxyamine and dicarboxylic acid dihydrazides, especially adipic acid dihydrazide, and salts thereof;

b) drying the gel obtained in step a) to give a sol-gel matrix comprising at least one amino reagent.

The silicate sol-gel matrix thus obtained is nanoporous. In one embodiment, the nanoporous sol-gel matrix obtained according to the invention is a so-called microporous matrix having a proportion of micropores of greater than 50% relative to the entirety of the pores. The diameter of these micropores is advantageously between 0.8 and 2 nm. The micropores prevent the molecules of the amino reagent or reagents leaving. Conversely, the aldehydes and/or ketones of small size such as formaldehyde, acetaldehyde or acetone are easily able to diffuse in the porous network. In another embodiment, the nanoporous sol-gel matrix obtained according to the invention is a so-called mesoporous matrix having a proportion of mesopores of more than 50% relative to the entirety of the pores. The diameter of these mesopores is advantageously between 2 and 6 nm. A porosity of this kind favors the diffusion in the pores of the larger aldehydes or ketones such as benzaldehyde. The probe molecules themselves, which by virtue of the interstitial water are present in protonated forms in the pores, remain trapped in the matrix, since they lose their volatility.

In the two types—microporous or mesoporous—of matrices, when the aldehyde or the ketone makes contact with the amino reagent or reagents, the carbonyl group reacts with the amine group to give an imine group. Generally speaking, this first reaction does not produce any coloration. The presence of a high concentration of amino compounds and pollutants in the pores is required in order to induce other reactions, which lead to a colored product. As an example, and as indicated above, a green coloration is obtained at saturation when the matrix of the invention is exposed to formaldehyde or acetone, and a reddish brown coloration with benzaldehyde.

Micropores are understood here to be pores with a diameter of less than 2 nm, and mesopores to be pores having a diameter of between 2 and 50 nm, according to the IUPAC definition. In general the diameter of micropores is from 0.8 to 2 nm. In the present invention, in cases where the matrices are essentially microporous, the diameter of the micropores is advantageously centered around 1.1±0.1 nm, meaning that at least 40 to 60% of the micropores have a diameter of approximately 1.1±0.1 nm. In the cases where the matrices are essentially mesoporous, the diameter of the mesopores is generally between 2 and 6 nm. According to the formulations, the diameter of the mesopores may be between 3 and 6 nm, with a maximum centered around 4.9±0.1 nm, or between 2 and 5 nm, with a maximum centered around 2.6±0.1 nm. In the present invention, the diameter of the mesopores is preferably between 3 and 6 nm and centered around 4.9±0.1 nm, meaning that at least 40 to 60% of the micropores have a diameter of approximately 4.9±0.1 nm. When the present application uses the expression "(of) between [a first value] and [a second value]", it is understood that the end points are included in the range indicated.

The microporous sol-gel matrices of the invention have a proportion of micropores of more than 50%, preferably from 55% to 98%, more preferably from 60% to 96%, the balance to 100% corresponding to the proportion of mesopores. The percentages are expressed relative to the entirety of the pores in the matrix.

The mesoporous sol-gel matrices of the invention advantageously have a proportion of mesopores of more than 50%, preferably from 55% to 98%, more preferably from 60% to 96%, the balance to 100% corresponding to the proportion of micropores.

A person skilled in the art will know how to select the specific proportions of micropores/mesopores depending on the intended application and its constraints. Accordingly, for use of the matrix of the invention as a filter, the objective is to trap as much of the carbonyl (aldehyde, ketone) pollutant or pollutants as possible while ensuring a high filter lifetime and preventing any leaching. Precedence will therefore be given to high proportions of micropores, preferably more than 50% and more preferably more than 80%, especially when the pollutants targeted are small in size (formaldehyde, acetaldehyde, acetone). When the pollutants are large-sized such as benzaldehyde, it is necessary to allow rapid diffusion of the aldehydes/ketones in the matrix in order for the pollutants to be trapped and to be reacted with the amino compounds and to obtain a change in coloration at saturation. Precedence will therefore be given to the high proportions of mesopores, preferably more than 60% and more preferably more than 80%.

The nanoporous sol-gel matrices of the invention are especially characterized in that they have a specific adsorption surface area of 15±2 to 900±100 $m^2 \cdot g^{-1}$, preferably 150±20 $m^2 \cdot g^{-1}$ to 900±100 $m^2 \cdot g^{-1}$. Advantageously, the microporous sol-gel matrices of the invention also have a specific adsorption surface area of 500±50 $m^2 \cdot g^{-1}$ to 900±100 $m^2 \cdot g^{-1}$, preferably of 650±70 $m^2 \cdot g^{-1}$ to 900±100 $m^2 \cdot g^{-1}$ and more preferably 750±70 $m^2 \cdot g^{-1}$ to 900±100 $m^2 \cdot g^{-1}$. The mesoporous sol-gel matrices of the invention advantageously have a specific adsorption surface area of 15±2 to 400±40 $m^2 \cdot g^{-1}$ and more preferably of 150±20 $m^2 \cdot g^{-1}$ to 300±50 $m^2 \cdot g^{-1}$. The specific surface area and the pore size distribution are determined by analysis of the liquid nitrogen adsorption-desorption isotherm with the DFT (Density Functional Theory) model.

The synthesis of the gel in step a) of the process of the invention is advantageously a one-pot synthesis, meaning that it is carried out in a single step with tetramethoxysilane or a mixture of tetramethoxysilane and the other organosilicon precursor, and the amino reagent or reagents, in the presence of water and, optionally, a polar organic solvent.

The synthesis of the gel in step a) is advantageously carried out from tetramethoxysilane or from a mixture of tetramethoxysilane and at least one other organosilicon precursor, selected from phenyltrimethoxysilane, phenyltriethoxysilane, a fluoroalkyltrimethoxysilane, a fluoroalkyltriethoxysilane, a chloroalkyltrimethoxysilane, a chloroalkyltriethoxysilane, an alkyltrimethoxysilane, an alkyltriethoxysilane, an aminopropyltriethoxysilane and mixtures thereof, preferably from a chloroalkyltrimethoxysilane, a chloroalkyltriethoxysilane, an aminopropyltriethoxysilane and mixtures thereof, more preferably from a chloropropyltrimethoxysilane, a chloropropyltriethoxysilane, a ($C_3$-$C_{10}$ alkyl)trimethoxysilane, a ($C_3$-$C_{10}$ alkyl)triethoxysilane, an aminopropyltriethoxysilane and mixtures thereof, preferentially from a propyltrimethoxysilane, a propyltriethoxysilane, a chloropropyltrimethoxysilane, a chloropropyltriethoxysilane, a propyltrimethoxysilane, a propyltriethoxysilane, an aminopropyltriethoxysilane and mixtures thereof, more preferentially from a chloropropyltrimethoxysilane and an aminopropyltriethoxysilane, more preferentially still from (3-chloropropyl)trimethoxysilane (ClTMOS) and (3-aminopropyl)triethoxysilane (APTES) and more preferentially still step a) is carried out from tetramethoxysilane or from a mixture of tetramethoxysilane and (3-chloropropyl)trimethoxysilane (ClTMOS) or from a mixture of tetramethoxysilane and (3-aminopropyl)triethoxysilane (APTES).

In one particular embodiment, the synthesis of the gel in step a) is advantageously carried out from tetramethoxysilane or from a mixture of tetramethoxysilane and at least one other organosilicon precursor, selected from phenyltrimethoxysilane, phenyltriethoxysilane, a fluoroalkyltrimethoxysilane, a fluoroalkyltriethoxysilane, a chloroalkyltrimethoxysilane, a chloroalkyltriethoxysilane, an aminopropyltriethoxysilane and mixtures thereof, preferably from a chloroalkyltrimethoxysilane, a chloroalkyltriethoxysilane, an aminopropyltriethoxysilane and mixtures thereof, more preferably from a chloropropyltrimethoxysilane, a chloropropyltriethoxysilane and an aminopropyltriethoxysilane and mixtures thereof, preferentially from a chloropropyltrimethoxysilane or an aminopropyltriethoxysilane, more preferentially from (3-chloropropyl)trimethoxysilane (ClTMOS) and (3-aminopropyl)triethoxysilane (APTES) and more preferably still step a) is carried out from tetramethoxysilane or from a mixture of tetramethoxysilane and (3-chloropropyl)trimethoxysilane (ClTMOS) or from a mixture of tetramethoxysilane and (3-aminopropyl)triethoxysilane (APTES).

When a mixture of tetramethoxysilane and another organosilicon precursor is used, the molar proportions of tetramethoxysilane/other organosilicon precursor may be varied between 1.0/0.01 and 1.0/0.2, preferably between 1.0/0.01 and 1.0/0.04.

The synthesis of the gel in step a) is advantageously carried out in aqueous medium in the presence of an acid. An acid is a chemical compound which is an acceptor, in the broad sense, of electronic doublets, and is generally defined by typical reactions in various solvents, more particularly by liberating the hydronium ion in the water solvent. Nonlimiting examples of acids which can be used in the context of the invention include hydrochloric acid, sulfuric acid, nitric acid, polystyrenesulfonic acid (CAS=28210-41-5). The acid may also be provided by the amino reagent when the latter is used in the form of an acid addition salt, such as, for example, methoxyamine, which is generally used in the form of the hydrochloric acid addition salt (methoxyammonium chloride). In other words, in this variant of the synthesis of the gel in acidic aqueous media, the acid is provided in the form of an acid addition salt of the amino reagent. Generally speaking, the appropriate acid addition salts include, though are not limited to, hydrochlorides and hydrogen sulfites ($HSO_3^-$), the hydrochlorides being preferred.

Carrying out the synthesis in acidic medium enables better coloration performance of the sol-gel matrix when the amino reagent reacts with aldehydes and/or ketones. Particularly good performance is obtained when the pH of the aqueous medium is less than 3, preferably less than 2.

The synthesis of the gel in step a) is carried out in aqueous medium. The aqueous medium is advantageously water or a mixture of water and a polar organic solvent. The polar organic solvent may be a protic organic solvent, preferably a C1 to C6 aliphatic alcohol, more preferably methanol or ethanol, and more preferably still methanol. The person skilled in the art will know how to easily determine the amounts of water and, optionally, of polar organic solvent, depending on the organosilica precursor or precursors employed.

Step a) of preparing the gel employs at least one amino reagent selected from hydroxylamine, methylhydroxylamine, tert-butylhydroxylamine, methoxyamine, tetraethylenepentamine, dihydrazides of dicarboxylic acids, especially adipic acid dihydrazide, and salts thereof, preferably from hydroxylamine, methylhydroxylamine, tert-butylhydroxylamine, methoxyamine, dihydrazides of dicarboxylic acids, especially adipic acid dihydrazide, and salts thereof, more preferably from methylhydroxylamine, methoxyamine, dihydrazides of dicarboxylic acids, especially adipic acid dihydrazide, and salts thereof, more preferably still from methylhydroxylamine, methoxyamine, dihydrazides of dicarboxylic acids, especially adipic acid dihydrazide, and salts thereof. Since the amine function of the amino reagents is a basic functional group, they may be present in the form of salts. These salts include, especially, acid addition salts. Examples of appropriate acid addition salts include, though are not limited to, hydrochlorides, hydrogen sulfites ($HSO_3^-$) and salts of adipic acid, preferably hydrochlorides and hydrogen sulfites, the hydrochlorides being particularly preferred. In one preferred embodiment, therefore, the amino reagent is selected from methylhydroxylamine hydrochloride, methoxyamine hydrochloride, tetraethylenepentamine and adipic acid dihydrazide.

The amount of amino reagent or of mixture of amino reagents is advantageously 0.1 mol·L$^{-1}$ to 1.0 mol·L$^{-1}$, preferably from 0.15 mol·L$^{-1}$ to 0.8 mol·L$^{-1}$ and more preferably from 0.2 mol·L$^{-1}$ to 0.6 mol·L$^{-1}$ of amino reagent. Below 0.1 mol·L$^{-1}$, the porous matrix will not contain sufficient reagent for effective trapping of aldehydes and/or ketones over a long duration, and there will be no change in coloration. Above 1.0 mol·L$^{-1}$, the limit is the mechanical strength in the matrices, which is more fragile. With these starting concentrations, the amino reagent content of the porous matrix at the end of step b) of the process of the invention is 0.8 mol·dm$^{-3}$ to 8.0 mol·dm$^{-3}$, preferably from 1.2 mol·dm$^{-3}$ to 6.4 mol·dm$^{-3}$, more preferably from 1.6 mol·dm$^{-3}$ to 4.8 mol·dm$^{-3}$.

The preparation of the gel in step a) is advantageously performed at a temperature of 10 to 70° C. Using a high temperature allows the hydrolysis and the condensation of the organosilicon precursors to be accelerated. For example, heating of the reaction mixture (sol) at 60° C. enables the gelling to be accelerated by a factor of 6 to 7 relative to preparation of the gel at ambient temperature (20-25° C.).

The gel obtained in step a) is lastly dried by evaporation of the water and, where appropriate, the organic solvent, to give the nanoporous sol-gel matrix comprising the amino reagent or reagents of the invention. Evaporating the water and, where appropriate, the organic solvent for the drying of the matrix may be carried out according to any method known to the person skilled in the art. Drying may be performed, for example, at ambient temperature or at a higher temperature, especially from 40 to 80° C. Drying is preferably carried out at a temperature of from the ambient temperature to 50° C. The term "ambient temperature" denoting a temperature of approximately 20° C. Drying is performed advantageously under an inert atmosphere.

Through the process of the invention it is possible not only to truly imprison the amino reagent in the pores but also to considerably increase the concentration thereof in the matrix, given the fact that, during the shrinkage accompanying the change from sol to gel, there is a contraction in volume by a factor of at least seven, generally of 7 to 10, and therefore an intrapore concentration of amino reagent of at least seven times greater, generally 7 to 10 times greater, than in solution. The volume concentration factor of the matrix corresponds to the ratio between the volume of the sol and the matrix after drying. With doping in solution, in other words by impregnation of a nanoporous matrix, limiting factors are the solubility of the dihydrazide and the equilibrium of the concentrations in the solution and in the matrix.

The invention also relates to the nanoporous silicate sol-gel matrix comprising at least one amino reagent selected from hydroxylamine, methylhydroxylamine, tert-butylhydroxylamine, methoxyamine, tetraethylenepentamine and dihydrazides of dicarboxylic acids, especially adipic acid dihydrazide, and salts thereof, which is obtainable by the process according to the invention as such, namely from an amino reagent as defined above and from tetramethoxysilane or a mixture from tetramethoxysilane and another organosilicon precursor as defined above. A matrix of this kind is especially characterized in that it has a specific adsorption surface area of $15\pm2$ to $900\pm100$ $m^2 \cdot g^{-1}$, preferably $150\pm20$ $m^2 \cdot g^{-1}$ to $900\pm100$ $m^2 \cdot g^{-1}$.

The amino reagent(s) content of this matrix is advantageously from 0.8 $mol \cdot dm^{-3}$ to 8.0 $mol \cdot dm^{-3}$, preferably from 1.2 $mol \cdot dm^{-3}$ to 6.4 $mol \cdot dm^{-3}$, more preferably from 1.6 $mol \cdot dm^{-3}$ to 4.8 $mol \cdot dm^3$.

In one embodiment the sol-gel matrix of the invention is a microporous matrix. It then has a proportion of micropores of more than 50%, preferably from 55% to 98%, more preferably from 60% to 96%, the balance to 100% corresponding to the proportion of mesopores. The percentages are expressed relative to the entirety of the pores in the matrix. The matrix of this embodiment advantageously has a specific adsorption surface area of $500\pm50$ $m^2 \cdot g^{-1}$ to $900\pm100$ $m^2 \cdot g^{-1}$, preferably from $650\pm70$ $m^2 \cdot g^{-1}$ to $900\pm100$ $m^2 \cdot g^{-1}$ and more preferably from $750\pm70$ $m^2 \cdot g^{-1}$ to $900\pm100$ $m^2 \cdot g^{-1}$. In this embodiment, the amino reagent content is advantageously from 0.8 $mol \cdot dm^{-3}$ to 8.0 $mol \cdot dm^{-3}$, preferably from 1.2 $mol \cdot dm^{-3}$ to 6.4 $mol \cdot dm^{-3}$, more preferably from 1.6 $mol \cdot dm^{-3}$ to 4.8 $mol \cdot dm^{-3}$.

In another embodiment the sol-gel matrix of the invention is a mesoporous matrix. The proportion of mesopores is then more than 50%, preferably from 55% to 98%, more preferably from 60% to 96%, the balance to 100% corresponding to the proportion of micropores. The percentages are expressed relative to the entirety of the pores in the matrix. The diameter of the mesopores is generally between 2 and 6 nm. According to the formulations, the diameter of the mesopores may be between 3 and 6 nm, with a maximum centered around $4.9\pm0.1$ nm, or between 2 and 5 nm, with a maximum centered around $2.6\pm0.1$ nm. In the present invention, the diameter of the mesopores is preferably from 3 to 6 nm and centered around $4.9\pm0.1$ nm, meaning that at least 40 to 60% of the micropores have a diameter of approximately $4.9\pm0.1$ nm.

The mesoporous sol-gel matrices of the invention advantageously have a specific adsorption surface area of $15\pm2$ to $400\pm40$ $m^2 \cdot g^{-1}$ and more preferably from $150\pm20$ $m^2 \cdot g^{-1}$ to $300\pm50$ $m^2 \cdot g^{-1}$. The mesoporous silicate sol-gel matrix of this embodiment advantageously has an amino reagent content of 0.8 $mol \cdot dm^{-3}$ to 8.0 $mol \cdot dm^{-3}$, preferably from 1.2 $mol \cdot dm^{-3}$ to 6.4 $mol \cdot dm^{-3}$, more preferably from 1.6 $mol \cdot dm^{-3}$ to 4.8 $mol \cdot dm^{-3}$.

By virtue of their particular physicochemical characteristics as described above, the porous silicate sol-gel matrices comprising one or more amino reagents, according to the invention, are capable of selective trapping of aldehydes and ketones while changing color at saturation, thereby allowing the filter to be changed and the disadvantages of leaching at saturation avoided, these disadvantages being experienced with other materials such as activated carbons. When the matrix reaches its saturation color, green for example in the case of formaldehyde or acetone, this indicates that the matrix is saturated and the pollutant can no longer be retained in the micropores of the matrix.

A further subject of the invention, therefore, is the use of a nanoporous silicate sol-gel matrix comprising at least one amino reagent, according to the invention, for selective trapping of one or more aldehydes and/or ketones present in the air.

In a first aspect of the use according to the invention, the nanoporous silicate sol-gel matrix comprising at least one amino reagent according to the invention is used as an air filter for abatement of aldehydes and/or of ketones, more particularly formaldehyde, acetone and/or benzaldehyde, preferably formaldehyde. The invention therefore also relates to a filter for abatement of aldehydes and/or of ketones, more particularly formaldehyde, acetone and/or benzaldehyde, preferably formaldehyde, which comprises a nanoporous silicate sol-gel matrix comprising at least one amino reagent, according to the invention, and also to a method for filtering air by trapping aldehydes and/or ketones present in the air, more particularly formaldehyde, acetone and/or benzaldehyde, preferably formaldehyde, in the pores of a nanoporous silicate sol-gel matrix comprising at least one amino reagent, according to the invention, by contacting said matrix with the air so as to sequester the aldehydes and/or ketones present in the air in the pores of said matrix. As described above, when the aldehyde or the ketone makes contact with the amino reagent or reagents, the carbonyl group reacts with the amine group to give an imine group. Generally speaking, this first reaction does not produce any coloration. The presence of a high concentration of amino compounds and pollutants in the pores is required in order to induce other reactions which lead to a colored product. This change in color allows determination of when the filter is saturated.

For use as an air filter for abatement of aldehydes and/or ketones, the nanoporous silicate sol-gel matrix of the invention advantageously has an amino compound content of 0.8 mol·dm$^{-3}$ to 8.0 mol·dm$^{-3}$, preferably of 1.2 mol·dm$^{-3}$ to 6.4 mol·dm$^{-3}$, more preferably of 1.6 mol·dm$^{-3}$ to 4.8 mol·dm$^{-3}$.

The sol-gel matrices of the invention can be used in combination with an air purifier employing activated carbon filters, thereby enabling the trapping of aldehydes and/or ketones, which are molecules trapped poorly or not at all by the activated carbon.

In a first embodiment, the nanoporous sol-gel matrix of the invention which is used for air filtration is a microporous matrix as defined above. This embodiment is particularly suitable for abatement of small-sized aldehydes and/or ketones such as formaldehyde.

In a second embodiment, the nanoporous sol-gel matrix of the invention which is used for air filtration is a mesoporous matrix as defined above. This embodiment is particularly suitable for abatement of large-sized aldehydes and/or ketones, more particularly benzaldehyde.

Of course, other embodiments of the invention could be envisaged by a person skilled in the art, without departing from the scope of the invention as defined by the claims hereinafter.

Nonlimiting working examples of the invention are described hereinafter.

BRIEF DESCRIPTION OF THE DRAWINGS

FIG. 1: Curves of concentration as a function of time for a filter composed of the material of example 3 and exposed to formaldehyde: the "upstream" curve for the concentration of formaldehyde measured without filter, and the "downstream" curve for the concentration of formaldehyde measured after passage through.

DETAILED DESCRIPTION

Examples

Abbreviations:
TMOS: tetramethoxysilane
Cl-TMOS: 3-chloropropyltrimethoxysilane
MeHA,HCl: methylhydroxyamine hydrochloride
CH3ONH2,HCl: methoxyamine hydrochloride
TEPA: tetraethylenepentamine
MeOH: methanol
I. Preparation and Analysis of Porous Sol-Gel Matrices Example 1: TMOS Matrix Doped with Methylhydroxyamine Reagents: MeHA,HCl (Sigma Aldrich, CAS number 4229-44-1, molar mass=83.52 g/mol, purity 98%), TMOS (CAS number: 681-84-5, molar mass=152.2 g/mol and density d=1.023 mg/cm$^{-3}$). Plastic honeycomb mold with cylindrical wells 6 mm in diameter and 10 mm in depth.

5M solution of MeHA,HCl with 6.264 g dissolved in 15 mL of H$_2$O
V(TMOS)=7.993 mL
V(H$_2$O)=23.083 mL
V(MeHA,HCl 5M)=5.92 mL (0.8M)
V(total)=37 mL Procedure: In a 60 mL flask, 7.993 mL of TMOS are mixed with 23.083 mL of water with magnetic stirring. The mixture is stirred for 5 min and then the 5.92 mL of 5M aqueous solution of MeHA,HCl are added. The formation of two phases and a heating of the mixture are observed, the mixture becoming homogeneous over time. When the temperature of the mixture returns to ambient temperature, the mixture is poured into a honeycomb mold placed in a crystallizer. The mold is covered with an aluminum membrane and is placed in a desiccator equipped with a relative humidity indicator. Gelling takes place after 20 h. Three days after gelling, the aluminum membrane is replaced with a semipermeable membrane (AB-Gene Greiner one). The desiccator is flushed with a stream of inert gas (Ar or N2) at a rate of 300 mL/min, and drying is halted when the humidity indicator indicates between 0.5 to 2% relative humidity.

The dry granules obtained are transparent and pale yellow in color.

After drying, transparent sol gel granules of a pale yellow color are obtained, with dimensions close to cylinders 3 mm in diameter and 5 mm in length. The methylhydroxyamine content of the porous sol-gel matrix is 6.4 mol·dm$^{-3}$.

Example 2: TMOS/Cl-TMOS Matrix Doped with Methoxyamine

Reagents: CH3ONH2,HCl (Sigma Aldrich, CAS number 593-56-6, molar mass=83.52 g·mol$^{-1}$, purity 98%), TMOS (CAS number: 681-84-5, molar mass=152.2 g·mol$^{-1}$ and density d=1.023 mg·cm$^{-3}$), Cl-TMOS (CAS No.: 2530-87-2, purity 97%, molar mass=198.72 g·mol$^{-1}$ and density=1.09 g·cm$^{-3}$), methanol (CH$_3$OH, molar mass 32.04 g·mol-1, density=0.792 g·cm$^{-3}$, purity 98%). Plastic honeycomb mold with cylindrical wells 6 mm in diameter and 10 mm in depth.

5M solution of CH3ONH2,HCl with 2.506 g dissolved in 6 mL of H$_2$O
V(TMOS)=9.182 mL
V (Cl-TMOS)=0.359 mL
V(MeOH)=20.589 mL
V(H2O)=0.950 mL
V(CH3ONH2,HCl 5M)=5.92 mL (0.8 M)
V(total)=37 mL Procedure: In a 60 mL flask, 9.182 mL of TMOS, 0.359 mL of Cl-TMOS are mixed with 20.589 mL of MeOH with magnetic stirring. The mixture is stirred for 5 min, and then 0.95 mL of water and the 5.92 mL of 5M aqueous solution of CH3ONH2,HCl are added. The mixture is left with stirring for 7 days at ambient temperature and then is poured into a honeycomb mold placed in a crystallizer equipped with a relative humidity indicator. The mold is covered with an aluminum membrane and is placed in a desiccator equipped with a relative humidity indicator. Gelling takes place after 13 days. Three days after gelling, the aluminum membrane is replaced with a semipermeable membrane (AB-Gene Greiner one). The desiccator is flushed with a stream of inert gas (Ar or N$_2$) at a rate of 300 mL/min, and drying is halted when the humidity indicator indicates between 0.5 to 2% relative humidity.

The dry granules obtained are translucent and pale yellow in color.

In the present example, the molar proportions of the reagents are TMOS/Cl-TMOS/MeOH/H$_2$O/CH3ONH2,HCl=1/0.032/8.3/6.25/0.484. The CH3ONH2 content of the porous matrix is 6.4 mol·dm$^{-3}$.

Example 3: TMOS Matrix with Methoxyamine

Reagents: CH3ONH2,HCl (Sigma Aldrich, CAS number 593-56-6, molar mass=83.52 g·mol-1, purity 98%), TMOS (CAS number: 681-84-5, molar mass=152.2 g·mol$^{-1}$ and density d=1.023 mg·cm$^{-3}$). Plastic honeycomb mold with cylindrical wells 6 mm in diameter and 10 mm in depth.

V(TMOS)=12.604 mL
V(H2O)=24.396 mL
CH3ONH2,HCl=2.52 g (0.815 M)
V(total)=37 mL

Procedure: 2.52 g of CH3ONH2,HCl is introduced into a 60 mL flask and 24.396 mL of water are added. The mixture is stirred until dissolution of the methoxyamine is complete. 12.064 mL of TMOS are added and the mixture is left with magnetic stirring for 6 h, after which the mixture is poured into a honeycomb mold placed in a crystallizer. The mold is covered with an aluminum membrane and the mold is placed in a desiccator equipped with a relative humidity indicator. Gelling sets in at between 72 and 96 h. The aluminum membrane is replaced with a semipermeable membrane and the desiccator is flushed with a stream of N2 at a rate of 300 mL/min, and drying is halted when the humidity indicator indicates between 0.5 to 2% relative humidity.

The dry granules obtained are white.

In the present example, the molar proportions of the reagents are TMOS/H2O/CH3ONH,HCl=1/16.16/0.353. The methoxyamine content of the porous matrix is 6.52 mol·dm$^3$.

Example 4: TMOS Matrix Doped with Adipic Acid Dihydrazide

Reagents: Adipic acid dihydrazide (Sigma Aldrich, CAS number 1071-93-8, molar mass=174.2 g·mol$^{-1}$, purity 98%), TMOS (CAS number: 681-84-5, molar mass=152.2 g·mol$^{-1}$ and density d=1.023 mg·cm$^{-3}$). Plastic honeycomb mold with cylindrical wells 6 mm in diameter and 10 mm in depth.

V(TMOS)=12.37 mL
V(H$_2$O)=24.65 mL
adipic acid dihydrazide=0.65 g (0.1M)
V(total)=37 mL Procedure: 0.65 g of adipic acid dihydrazide is introduced into a 60 mL flask and 24.65 mL of water are added. The mixture is stirred until dissolution of the adipic acid dihydrazide is complete. 12.37 mL of TMOS are added and the mixture is left with magnetic stirring. Formation of two phases is observed. To accelerate the reaction, the flask is heated to 40° C. The mixture is left with stirring until the mixture becomes homogeneous (20 min). The mixture is poured into a honeycomb mold placed in a crystallizer. The mold is covered with an aluminum membrane and the mold is placed in a desiccator equipped with a relative humidity indicator. Gelling is rapid (35 min). After 3 days, the aluminum membrane is replaced with a semipermeable membrane and the desiccator is flushed with a stream of N2 at a rate of 300 mL/min, and drying is halted when the humidity indicator indicates between 0.5 to 2% relative humidity.

The dry granules obtained are white.

In the present example, the molar proportions of the reagents are TMOS/H$_2$O/adipic acid dihydrazide=1/16.64/0.044. The adipic acid dihydrazide content of the porous matrix is 0.8 mol·dm$^{-3}$.

Example 5: TMOS Matrix Doped with Adipic Acid Dihydrazide

Reagents: Adipic acid dihydrazide (Sigma Aldrich, CAS number 1071-93-8, molar mass=174.2 g·mol$^{-1}$, purity 98%), TMOS (CAS number: 681-84-5, molar mass=152.2 g·mol$^{-1}$ and density d=1.023 mg·cm$^{-3}$). Plastic honeycomb mold with cylindrical wells 6 mm in diameter and 10 mm in depth.

V(TMOS)=12.37 mL
V(H2O)=24.65 mL
Adipic acid dihydrazide=1.3 g (0.2M)
V(total)=37 mL Procedure: 1.3 g of adipic acid dihydrazide are introduced into a 60 mL flask and 24.65 mL of water are added. The mixture is stirred until dissolution of the adipic acid dihydrazide is complete. 12.37 mL of TMOS are added and the mixture is left with magnetic stirring. Formation of two phases is observed. To accelerate the reaction, the flask is heated to 40° C. The mixture is left with stirring until the mixture becomes homogeneous (40 min). The mixture is poured into a honeycomb mold placed in a crystallizer. The mold is covered with an aluminum membrane and the mold is placed in a desiccator equipped with a relative humidity indicator. Gelling is rapid (43 min). After 3 days, the aluminum membrane is replaced with a semipermeable membrane and the desiccator is flushed with a stream of N2 at a rate of 300 mL/min, and drying is halted when the humidity indicator indicates between 0.5 to 2% relative humidity.

The dry granules obtained are transparent.

In the present example, the molar proportions of the reagents are TMOS/H2O/adipic acid dihydrazide=1/16.64/0.176. The adipic acid dihydrazide content of the porous matrix is 1.6 mol·dm$^{-3}$.

Example 6: TMOS Matrix Doped with Adipic Acid Dihydrazide and Methoxyamine

Reagents: Adipic acid dihydrazide (Sigma Aldrich, CAS number 1071-93-8, molar mass=174.2 g·mol$^{-1}$, purity 98%), CH3ONH2,HCl (Sigma Aldrich, CAS number 593-56-6, molar mass=83.52 g·mol$^{-1}$, purity 98%), TMOS (CAS number: 681-84-5, molar mass=152.2 g·mol$^{-1}$ and density d=1.023 mg·cm$^{-3}$), methanol (CH$_3$OH, molar mass 32.04 g·mol$^{-1}$, density=0.792 g·cm$^{-3}$, purity 98%). Plastic honeycomb mold with cylindrical wells 6 mm in diameter and 10 mm in depth.

V(TMOS)=12.604 mL
V(H$_2$O)=24.396 mL
Adipic acid dihydrazide=0.65 g (0.1 M)
CH3ONH2,HCl=1.855 g (0.6 M)
V(total)=37 mL Procedure: 0.65 g of adipic acid dihydrazide and 1.855 g of CH3ONH2,HCl are introduced into a 60 mL flask and 24.65 mL of water are added. The mixture is stirred until dissolution of the two compounds is complete. 12.604 mL of TMOS are added and the mixture is left with magnetic stirring. Formation of two phases is observed and the mixture is left with stirring until the mixture becomes homogeneous. The mixture is poured into a honeycomb mold placed in a crystallizer. The mold is covered with an aluminum membrane and the mold is placed in a desiccator equipped with a relative humidity indicator. At the end of 3 days after gelling, the aluminum membrane is replaced with a semipermeable membrane and the desiccator is flushed with a stream of N2 at a rate of 300 mL/min. Drying is halted when the humidity indicator indicates between 0.5 to 2% relative humidity.

The dry granules obtained are transparent.

In the present example, the molar proportions of the reagents are TMOS/H2O/adipic acid dihydrazide/CH3ONH2,HCl=1/16.16/0.044/0.265. The dihydrazide content of the porous matrix is 0.8 mol·dm$^{-3}$ and the methoxyamine content is 4.8 mol·dm$^{-3}$.

Example 7: TMOS Matrix Doped with Adipic Acid Dihydrazide and Methoxyamine

Reagents: Adipic acid dihydrazide (Sigma Aldrich, CAS number 1071-93-8, molar mass=174.2 g·mol$^{-1}$, purity 98%), CH3ONH2,HCl (Sigma Aldrich, CAS number 593-56-6, molar mass=83.52 g·mol$^{-1}$, purity 98%), TMOS (CAS number: 681-84-5, molar mass=152.2 g·mol$^{-1}$ and density d=1.023 mg·cm$^{-3}$), methanol (CH$_3$OH, molar mass 32.04 g·mol$^{-1}$, density=0.792 g·cm$^{-3}$, purity 98%). Plastic honeycomb mold with cylindrical wells 6 mm in diameter and 10 mm in depth.

V(TMOS)=17.033 mL
V(H$_2$O)=32.967 mL
Adipic acid dihydrazide=1.745 g (0.2M)
CH3ONH2,HCl=0.42 g (0.1M)
V(total)=50 mL Procedure: 1.745 g of adipic acid hydrazide and 0.42 g of CH$_3$ONH$_2$,HCl are introduced into a 100 mL flask and 32.967 mL of water are added. The mixture is stirred until dissolution of the two compounds is complete. 17.033 mL of TMOS are added and the mixture is left with magnetic stirring. Formation of two phases is observed and the mixture is left with stirring until the mixture becomes homogeneous. The mixture is poured into a honeycomb mold placed in a crystallizer. The mold is covered with an aluminum membrane and the mold is placed in a desiccator equipped with a relative humidity indicator. At the end of 3 days after gelling, the aluminum membrane is replaced with a semipermeable membrane and the desiccator is flushed with a stream of N2 at a rate of 300 mL/min. Drying is halted when the humidity indicator indicates between 0.5 to 2% relative humidity.

The dry granules obtained are transparent.

In the present example, the molar proportions of the reagents are TMOS/H$_2$O/adipic acid dihydrazide/CH3ONH2,HCl=1/16.16/0.0866/0.043. The dihydrazide content of the matrix is 1.6 mol·dm$^3$ and the methoxyamine content is 0.8 mol·dm$^{-3}$.

Example 8: TMOS/APTES Matrix Doped with Methoxyamine

Reagents: CH$_3$ONH$_2$,HCl (Sigma Aldrich, CAS number 593-56-6, molar mass=83.52 g·mol-1, purity 98%), TMOS (CAS number: 681-84-5, molar mass=152.2 g·mol$^{-1}$ and density d=1.023 mg·cm$^{-3}$), APTES (CAS number: 919-30-2, purity 99%, molar mass=221.37 g·mol$^{-1}$ and density d=0.946 mg·cm$^{-3}$), methanol (CH$_3$OH, molar mass 32.04 g·mol$^{-1}$, density=0.792 g·cm$^{-3}$, purity 98%). Plastic honeycomb mold with cylindrical wells 6 mm in diameter and 10 mm in depth.

5M solution of CH3ONH2,HCl with 2.506 g dissolved in 6 mL of H$_2$O
V(TMOS)=9.447 mL
V(APTES)=0.150 mL
V(MeOH)=20.547
V(H$_2$O)=0.937 mL
CH3ONH2,HCl=5.92 mL of the 5 M aqueous solution (0.8M)
V(total)=37 mL Procedure: 9.447 mL of TMOS and 0.15 mL of APTES are introduced into a 60 mL flask and 20.547 mL of MeOH are added. The mixture is stirred and then 5.92 mL of the aqueous methoxyamine solution and 0.937 mL of water are added and the mixture is left with magnetic stirring. The mixture is poured into a honeycomb mold placed in a crystallizer. The mold is covered with an aluminum membrane and the mold is placed in a desiccator equipped with a relative humidity indicator. At the end of 3 days after gelling, the aluminum membrane is replaced with a semipermeable membrane and the desiccator is flushed with a stream of N2 at a rate of 300 mL/min. Drying is halted when the humidity indicator indicates between 0.5 to 2% relative humidity.

The dry granules obtained are white.

In the present example, the molar proportions of the reagents are TMOS/APTES/MeOH/H$_2$O/CH3ONH2,HCl=0.99/0.01/8/6/0.466. The methoxyamine content of the matrix is 6.4 mol·dm$^{-3}$.

Example 9: TMOS/Cl-TMOS Matrix Doped with Methylhydroxyamine in Buffered Medium Reagents: MeHA,HCl (Sigma Aldrich, CAS number 4229-44-1, molar mass=83.52 g/mol, purity 98%), TMOS (CAS number: 681-84-5, molar mass=152.2 g/mol and density d=1.023 mg/mL), ClTMOS (CAS number: 2530-87-2, molar mass=198.7 g/mol, density=1.09 mg/mL), MeOH (molar mass=32.04 g/mole, d=0.791 mg/mL, 0.51 M citrate buffer (pH=4.6), Plastic honeycomb mold with cylindrical wells 6 mm in diameter and 10 mm in depth.

5M solution of MeHA,HCl with 6.264 g dissolved in 15 mL of H$_2$O
Citrate buffer, pH=4.6, obtained by mixing 25.5 mL of citric acid (2M) and 24.5 mL of sodium citrate (2M) in 50 mL of water.
V(TMOS)=22.823 mL
V(Cl-TMOS)=0.939 mL
MeOH=13.354 mL
V(H$_2$O)=0.384 mL
V(MeHA,HCl 5M)=4 mL (0.4M)
7.5 mL of citrate buffer
V(total)=50 mL Procedure: In a 100 mL flask, 22.823 mL of TMOS are mixed with 0.939 mL of Cl-TMOS and 13.354 mL of MeOH. 23.083 mL of water with magnetic stirring. The mixture is cooled to −25° C. A second mixture is made with 7.5 mL of buffer solution, 4 mL of the aqueous solution of MeHA,HCl and 0.384 mL of water and is poured into the first mixture cooled to −25° C. Stirring is maintained for 6 min and then the mixture is returned to ambient temperature and is poured into a honeycomb mold placed in a crystallizer. The mold is covered with an aluminum membrane and is placed in a desiccator equipped with a relative humidity indicator. Gelling sets in after 30-35 min. Two days after gelling, the aluminum membrane is replaced with a semipermeable membrane (AB-Gene Greiner one). The desiccator is flushed with a stream of inert gas (Ar or N2) at a rate of 300 mL/min, and drying is halted when the humidity indicator indicates between 0.5 to 2% relative humidity.

After drying, transparent sol gel granules are obtained with dimensions close to cylinders of 3 mm in diameter and 5 mm in length. The methylhydroxyamine content of the porous sol-gel matrix is 4.0 mol·dm$^{-3}$.

In the present example, the molar proportions of the reagents are TMOS/ClTMOS/MeOH/H2O/MeHA,HCl/citric acid/sodium citrate=1/0.033/2.21/4.3/0.13/0.024/0.025

Example 10: TMOS-Cl-TMOS Matrix Doped with Tetraethylenepentamine (TEPA)

Reagents: TEPA (Sigma Aldrich, CAS number 112-57-2, molar mass=194.34 g·mol-1, technical grade, d=0.998 g/mL), TMOS (CAS number: 681-84-5, molar mass=152.2 g·mol-1 and density d=1.023 mg·cm$^{-3}$), CITMOS (CAS number: 2530-87-2, molar mass=198.7 g/mol, density=1.09 mg/mL), methanol (molar mass=32.04 g·mol$^{-1}$, d=0.791 g·mL$^{-1}$) HCl 12.18 M. Plastic honeycomb mold with cylindrical wells 6 mm in diameter and 10 mm in depth.

V(TMOS)=11.903 mL
V(CITMOS)=0.469 mL
V(MeOH)=18.78 mL
V(H2O)=5.938 mL
V(HCl)=4.51 mL
TEPA=3.41 mL
V(total)=50 mL Procedure: In a 100 mL round-bottom flask, 11.903 mL of TMOS are mixed with 0.469 mL of CITMOS and 8.0 mL of MeOH. The mixture is kept at −25° C. and is stirred for 10 min. A second mixture, consisting of 10.78 mL of MeOH, 3.41 mL of TEPA, 4.51 mL of concentrated HCl (fuming HCl 37%; Sigma Aldrich, CAS number 7647-01-0), is poured into the flask and the final mixture is stirred vigorously for 2 minutes. The mixture is poured into a honeycomb mold placed in a crystallizer. Gelling sets in 5 minutes after. The mold is covered with an aluminum membrane and the mold is placed in a desiccator equipped with a relative humidity indicator. The aluminum membrane is replaced with a semipermeable membrane and the desiccator is flushed with a stream of N2 at a rate of 300 mL/min, and drying is halted when the humidity indicator indicates between 0.5 to 2% relative humidity.

The dry granules obtained are transparent and pale yellow in color.

In the present example, the molar proportions of the reagents are TMOS/CITMOS/MeOH/H2O/HCl/TEPA=1/0.03/5.75/6.5/0.7/0.2. The TEPA concentration of the matrix is 2.88 mol·dm$^{-3}$.

II. Characterization of Porosity and Filtration Properties

II.1 Porosity and Specific Surface Area

The specific surface areas, pore diameters, and proportions of micropores and mesopores were determined by analysis of the liquid nitrogen adsorption-desorption isotherm (77 K) with the DFT (Density Functional Theory) model, using the Autosorb 1 from Quantachrome.

The results are summarized in Table 1 below.

II.2 Trapping Efficacy in Formaldehyde Stream

The tests for measuring trapping efficacy in a stream are carried out with gas mixtures containing formaldehyde at high concentration, using the device described below.

Formaldehyde Filter Exposure Device

A permeation oven (model PUL010 from Calibrage-fivespillard) is used to generate a gaseous stream of nitrogen containing formaldehyde. Since formaldehyde is unstable in monomeric form, paraformaldehyde is used. This polymer is placed in a permeation tube, which is closed with a permeable membrane and placed into the oven. The oven is heated to 103° C. to give off the monomeric formaldehyde vapor. The oven is flushed with a gas stream of 150 mL/min.

At the exit of the permeation oven, the concentration of formaldehyde in the stream of nitrogen of 150 ml/min is 10.7 ppm or 13.375 mg/m$^3$. This mixture is diluted with humid air and is conveyed into a 1 L round-bottom flask which has four outlets. The 1$^{st}$ outlet is connected to a formaldehyde sensor, Profil'air® (Ethera, France), which measures the concentration of formaldehyde in the flask. The 2$^{nd}$ and 3$^{rd}$ outlets are each dedicated to exposure of a filter, and the 4$^{th}$ outlet is the vent. In the flask, the concentration of formaldehyde is 900±100 ppb with a humidity of 30±3%.

Each filter is composed of 0.5 g of the material under test, placed in a 3 mL syringe equipped with two end-pieces. The syringe is connected by one of the end pieces to the flask of gaseous mixture, and by the other end to a formaldehyde filter, which is connected in turn to a pump. The formaldehyde/air mixture is drawn through the syringe with a flow rate of 200 ml/min. The concentration of formaldehyde measured upstream (outlet 1) and downstream of the filter (outlets 2 and 3) twice a day makes it possible to work out the amount of formaldehyde trapped in each filter after a predetermined exposure time.

Leaching tests were also carried out to show the irreversibility of the reaction. Each filter already exposed is subjected to a humid stream of N$_2$ (50% RH) at a rate of 400 ml/min. The stream emerging from the filter is taken into a 500 mL round-bottom flask, from which the gas is pumped at 200 mL/min for measurement of formaldehyde using a Profil'air® sensor (Ethera, France).

Measurement of Trapping Efficacy

The efficacy of trapping of the filters from examples 1 to 10 was evaluated. The results are summarized in Table 1.

Figure 1:
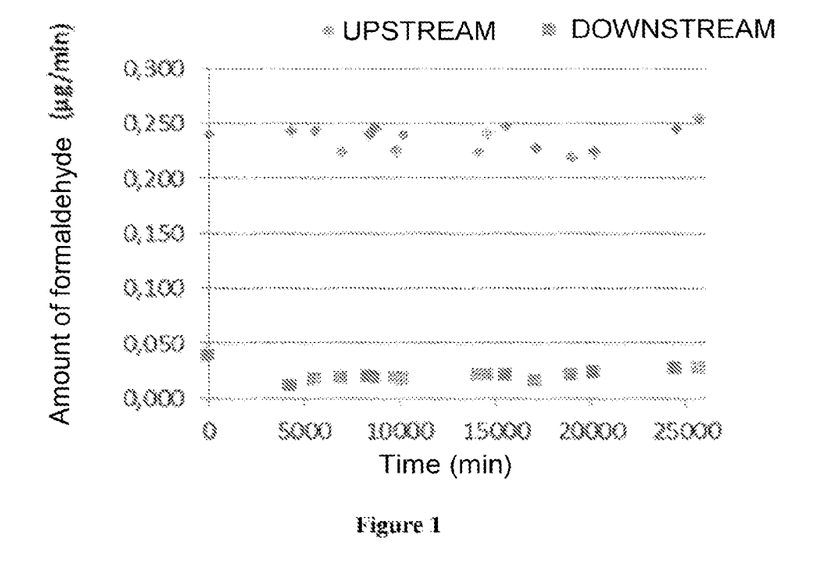
Figure 2:
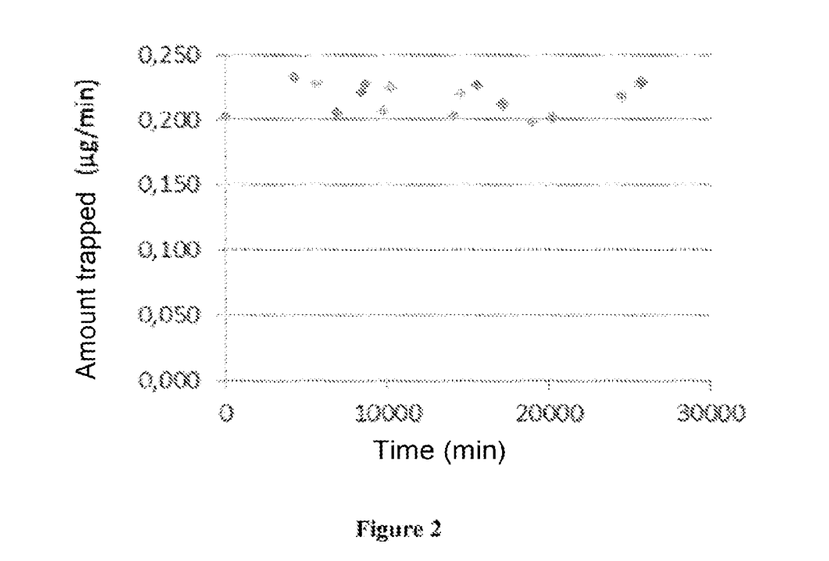
FIG. 2: Difference between the "upstream" and "downstream" curves of FIG. 1, corresponding to the amount of formaldehyde trapped over time.

FIG. 1 shows an "upstream" concentration curve, corresponding to the concentration of formaldehyde measured without filter, and a "downstream" concentration curve, measured after passage through a filter composed of the material of example 3. FIG. 2 represents the difference and corresponds to the amount of formaldehyde trapped over time. Calculation of the area under this curve gives the total amount of formaldehyde trapped. After 25000 minutes, amounting to 17.4 days, the filter still does not show saturation. The amount of formaldehyde trapped is 10.9 mg/g (g of filter). With the trapping of the formaldehyde, the filter becomes green and the intensity of the coloration increases with the amount of pollutant trapped.

| Example No | Formulation (molar ratio) | Porosity Sads (BET/DFT) V(pore) % micro/meso-pores Pore diameter distribution | Trapping efficacy, mg CH2O/g filter for x h of exposure | Degree of leaching |
|---|---|---|---|---|
| 2 | TMOS/CITMOS/MeOH/H2O/CH3ONH2, HCl 1/0.032/8.3/6.25/0.484 | 404/508 m2/g 0.16 cm3/g 93.5%/6.5% 10-26 Å | 9.56 mg/g - 124 h Color change: yellow → green | — |
| 3 | TMOS/H2O/CH3ONH2, HCl 1/16.16/0.353 | 1060/1150 m2/g 0.52 cm3/g 65.2%/34.8% 11-40 Å | 10.9 mg/g - 427 h Color change: white → green | 0.09% |

| Example No | Formulation (molar ratio) | Porosity Sads (BET/DFT) V(pore) % micro/mesopores Pore diameter distribution | Trapping efficacy, mg CH2O/g filter for x h of exposure | Degree of leaching |
|---|---|---|---|---|
| 4 | TMOS/H2O/adipic acid dihydrazide 1/16.64/0.044 | 423/316 m2/g 0.33 cm3/g 0%/100% 21-80 Å | 9.59 mg/g - 360 h | 0.30% |
| 5 | TMOS/H2O/adipic acid dihydrazide 1/16.64/0.088 | 267/205 m2/g 0.24 cm3/g 0%/100% 29-80 Å | 9.03 mg/g - 333 h | 0.33% |
| 6 | TMOS/H2O/adipic acid dihydrazide/CH3ONH2, HCl 1/16.16/0.044/0.265 | 560/420 m2/g 0.32 cm3/g 16.2%/83.8% 11-55 Å | 37 mg/g - 450 h >50 mg/g at saturation | 0.1% |
| 7 | TMOS/H2O/adipic acid dihydrazide/CH3ONH2, HCl 1/16.16/0.087/0.043 | 14.3/6.5 m2/g 0.015 cm3/g 0/100% 36-96 Å | 11 mg/g - 288 h | — |
| 8 | TMOS/APTES/MeOH/H2O/CH3ONH2, HCl 0.99/0.01/8/6/0.446 | — | 8.91 mg/g 334 h White to green | — |
| 9 | TMOS/ClTMOS/MeOH/H2O/MeHA, HCl + citrate buffer pH = 4.7 | 242/249 m2/g 11-27 Å 61.9% | 4.16 mg/g 110 h | — |
| 10 | TMOS/ClTMOS/MeOH/H2O/HCl/TEPA 1/0.03/5.75/6.5/0.7/0.2 | — | 16.18 mg/g, 273 h Bright yellow-dark yellow/brown | — |

II.3 Trapping in Stream of Acetone and in Stream of Benzaldehyde

The tests measuring trapping efficacy in a stream are carried out with saturated vapor either of acetone or of benzaldehyde at high concentration, by passing the saturated vapor in static mode. For this, the filter is exposed above the pure liquid.

On exposure of matrices exposed to saturated pollutant vapor, a green coloration is observed with acetone (tests with samples from Examples 3 and 6) and a reddish brown coloration with benzaldehyde (test with sample from Example 6).

The invention claimed is:

1. A porous silicate sol-gel matrix comprising at least one aminic reagent selected from hydroxylamine, methylhydroxylamine, tert-butylhydroxylamine, methoxyamine, tetraethylenepentamine, and dicarboxylic acid dihydrazides, and salts thereof, the at least one aminic reagent being trapped in pores of the porous silicate sol-gel matrix,
wherein the porous silicate sol-gel matrix is prepared by a process comprising the steps of:
a) synthesizing a gel from tetramethoxysilane or a mixture of tetramethoxysilaneand another organosilicon precursor, selected from phenyltrimethoxysilane, phenyltriethoxysilane, fluoroalkyltrimethoxysilane, fluoroalkyltriethoxysilane, chloroalkylmethoxysilane, chloroalkyl- ethoxysilane, alkyltrimethoxysilane, alkyltriethoxysilane, aminopropyltriethoxysilane and mixtures thereof, the synthesizing being carried out in an aqueous medium at a temperature of from 10 to 70° C. in the presence of at least one aminic reagent selected from hydroxylamine, methylhydroxylamine, tert-butylhydroxylamine, methoxyamine, tetraethylenepentamine, and dicarboxylic acid dihydrazides, and salts thereof, and
b) drying the gel obtained in step a) to give a porous silicate sol-gel matrix comprising at least one aminic reagent in which the at least one aminic reagent is trapped in the pores of the porous silicate sol-gel matrix,
wherein the porous silicate sol-gel matrix has a specific adsorption surface area of $15\pm2$ $m^2 \cdot g^{-1}$ to $900\pm100$ $m^2 \cdot g^{-1}$, and
wherein the at least one aminic reagent content of said porous silicate sol-gel matrix is from 0.8 mol·dm$^{-3}$ to 8.0 mol·dm$^{-3}$.

2. The porous silicate sol-gel matrix as claimed in claim 1, wherein the pores of the porous silicate sol-gel matrix has a proportion of micro ores of more than 50% and a balance to 100% corresponding to a proportion of mesopores.

3. The porous silicate sol-gel matrix as claimed in claim 2, wherein the micropores have diameters of between 0.8 to 2 nm, with a maximum centered around $1.1\pm0.1$ nm.

4. The porous silicate sol-gel matrix as claimed in claim 2, wherein the porous silicate sol-gel matrix has a specific adsorption surface area of $500\pm50$ $m^2 \cdot g^{-1}$ to $900\pm100$ $m^2 \cdot g^{-1}$.

5. The porous silicate sol-gel matrix as claimed in claim 1, wherein the pores of the porous silicate sol-gel matrix has a proportion of mesopores of more than 50% and a balance to 100% corresponding to a proportion of micropores.

6. The porous silicate sol-gel matrix as claimed in claim 5, wherein the mesopores have diameters of between 3 and 6 nm, with a maximum centered around $4.9\pm0.1$ nm.

7. The porous silicate sol-gel matrix as claimed in claim 5, wherein the porous silicate sol-gel matrix has a specific adsorption surface area of $15\pm2$ $m^2 \cdot g^{-1}$ to $400\pm40$ $m^2 \cdot g^{-1}$.

8. The porous silicate sol-gel matrix as claimed in claim 1, wherein the at least one aminic reagent is selected from methylhydroxylamine, methoxyamine, adipic acid dihydrazide and salts thereof.

9. A method of trapping aldehydes and/or ketones which are present in air comprising contacting the porous silicate sol-gel matrix as claimed in claim 1 with the air so as to sequester the aldehydes and/or ketones in the pores of said porous silicate sol-gel matrix.

10. The method as claimed in claim 9, wherein the porous silicate sol-gel matrix is comprised in an air filter for abatement of aldehydes and/or ketones, and the air contacts said porous silicate sol-gel matrix of said air filter for abatement of aldehydes and/or ketones.

11. An aldehyde and/or ketone abatement filter, comprising the porous silicate sol-gel matrix as claimed in claim 1.

* * * * *